(12) United States Patent
Wigren et al.

(10) Patent No.: US 9,408,026 B2
(45) Date of Patent: Aug. 2, 2016

(54) METHODS AND ARRANGEMENTS FOR POSITIONING IN WIRELESS COMMUNICATIONS SYSTEMS

(75) Inventors: Karl Torbjörn Wigren, Uppsala (SE); Claudia Muñiz Garcia, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 106 days.

(21) Appl. No.: 14/349,966

(22) PCT Filed: Oct. 4, 2011

(86) PCT No.: PCT/SE2011/051180
§ 371 (c)(1),
(2), (4) Date: Apr. 4, 2014

(87) PCT Pub. No.: WO2013/051969
PCT Pub. Date: Apr. 11, 2013

(65) Prior Publication Data
US 2014/0248906 A1 Sep. 4, 2014

(51) Int. Cl.
*G01S 5/00* (2006.01)
*H04W 4/02* (2009.01)
*H04W 64/00* (2009.01)
*G01S 5/02* (2010.01)
(Continued)

(52) U.S. Cl.
CPC .. *H04W 4/02* (2013.01); *G01S 5/02* (2013.01); *H04W 64/00* (2013.01); *H04W 24/10* (2013.01); *H04W 88/08* (2013.01)

(58) Field of Classification Search
CPC ................................ H04W 64/00; H04W 4/02
USPC ....................................................... 455/456.1
See application file for complete search history.

(56) References Cited

U.S. PATENT DOCUMENTS

| 2006/0009235 | A1* | 1/2006 | Sheynblat | G01S 5/0036 455/456.1 |
|---|---|---|---|---|
| 2007/0173288 | A1* | 7/2007 | Skarby | H01Q 1/246 455/561 |
| 2008/0287163 | A1 | 11/2008 | Skarby et al. | |

(Continued)

OTHER PUBLICATIONS

3GPP TS 36.214 V10.0.0) Dec. 2010) Physical Layer Measurements.*

(Continued)

*Primary Examiner* — Vladimir Magloire
*Assistant Examiner* — Ernest Tacsik
(74) *Attorney, Agent, or Firm* — Christopher & Weisberg, P.A.

(57) ABSTRACT

A method of reporting hidden sector information from a base station node in a wireless communication system. The base station node has an internal multi-sector structure that is hidden from the rest of the system. The hidden sector information has sector information of the multi-sector structure is only internally available in the base station node. Enhanced cell-ID measurements associated with a first user equipment communicating with the base station are obtained, and formatted into information elements of a measurement report, each such information element having a plurality of symbols. Subsequently, hidden sector information for the first user equipment is retrieved and has an indication of an antenna sector of the base station in which the first user equipment is located. The retrieved dormant/latent sector information uses at least one selected symbol of the plurality of symbols of the measurement report to provide a transformed measurement report.

24 Claims, 13 Drawing Sheets

(51) Int. Cl.
*H04W 24/10* (2009.01)
*H04W 88/08* (2009.01)

(56) References Cited

U.S. PATENT DOCUMENTS

| | | | | |
|---|---|---|---|---|
| 2009/0318151 A1* | 12/2009 | Jung | H04W 36/32 | 455/436 |
| 2010/0041418 A1* | 2/2010 | Edge | H04W 4/02 | 455/456.2 |
| 2010/0087198 A1* | 4/2010 | Wigren | G01S 5/02 | 455/446 |
| 2010/0195566 A1* | 8/2010 | Krishnamurthy | H04L 5/0007 | 370/328 |
| 2011/0190005 A1* | 8/2011 | Cheon | H04W 24/00 | 455/456.1 |

OTHER PUBLICATIONS

3GPP TS 36.455 V10.0.0 (Dec. 2010) User Equipment (UE) positioning in E-UTRAN.*
A. Kangas and T. Wigren, "Location Coverage and Sensitivity with A-GPS", pp. 361-363, dated Jul. 2, 2004, consisting of 3-pages.
Torbjörn Wigren, "Adaptive Enhanced Cell-ID Fingerprinting Localization by Clustering of Precise Position Measurements", IEEE Transactions on Vehicular Technology, vol. 56, No. 5, Sep. 24, 2007, pp. 3199-3209 consisting of 11-pages.
"3GPP TS 32.762 V10.0.0; (Jun. 2011), Technical Specification Group Services and System Aspects; Telecommunication management; Generic Radio Access Network (RAN) Network Resource Model (NRM) Integration Reference Point (IRP); Information Service (IS) (Release 10)", 3GPP Standard; 3rd Generation Partnership Project (3GPP), pp. 1-19, (Jun. 2011) consisting of 19-pages.
International Search Report and Written Opinion dated Jul. 5, 2012 for International Application No. PCT/SE2011/051180, International Application Date: Oct. 4, 2011 consisting of 11-pages.
"3GPP TS 23.032 V6.0.0; Technical Specification Group Core Network; Universal Geographical Area Description (GAD) (Release 6)", 3GPP Standard; 3rd Generation Partnership Project (3GPP), pp. 1-29, XP050362054, Dec. 1, 2004 consisting of 30-pages.
Anonymous: "Puncturing", CDMA Online , Jul. 20, 2010, pp. 1-2, XP002677714, Retrieved from the Internet: URL:http://web.archive.org/web/20100720215151/http://www.cdmaonline.com/interactive04/workshops/terms1/1033.htm [retrieved on Jun. 14, 2012] consisting of 1-page.
"3GPP Technical Specification Group Services and System Aspects; Telecommunication management; Generic Radio Access Network (RAN) Network Resource Model (NRM) Integration Reference Point (IRP); Information Service (IS) (Release 10)", 3GPP TS 32.792, 3GPP Standard; No. V1.0.0, pp. 1-19, XP050476410, Mar. 25, 2011 consisting of 20-pages.
"3GPP TS 32.762 V10.3.0; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 10)", 3GPP Standard; 3rd Generation Partnership Project (3GPP), pp. 1-41, XP050476591, Mar. 30, 2011 consisting of 42-pages.
"3GPP TS 36.455 V10.2.0; Technical Specification Group Radio Access Network; Evolved Universal Terrestrial Radio Access (E-UTRA); LTE Positioning Protocol A (LPPa) (Release 10)", 3GPP Standard; 3rd Generation Partnership Project (3GPP RAN WG3), pp. 1-52, XP050554054, Sep. 26, 2011 consisting of 52-pages.
"3GPP TS 36.305 V10.3.0; Technical Specification Group Radio Access Network; Evolved Universal Terrestrial Radio Access Network (E-UTRAN); Stage 2 functional specification of User Equipment (UE) positioning in E-UTRAN (Release 10)", 3GPP Standard; 3rd Generation Partnership Project (3GPP RAN WG2), pp. 1-51, XP050554291, Sep. 30, 2011 consisting of 54-pages.
International Preliminary Report on Patentability dated Sep. 13, 2013 for International Application No. PCT/SE2011/051180, International Application Date: Oct. 4, 2011 consisting of 20-pages.

* cited by examiner

METHODS AND ARRANGEMENTS FOR POSITIONING IN WIRELESS COMMUNICATIONS SYSTEMS

TECHNICAL FIELD

The present disclosure concerns methods and arrangements for positioning in wireless communication systems in general, and specifically to methods and arrangements for improving positioning accuracy in such systems.

BACKGROUND

The LTE (Long Term Evolution) cellular system specified by the 3GPP (Third Generation Partnership Project) provides a variety of location based services. These services all utilize the location of a UE (user equipment) e.g. mobile terminal for one purpose or the other. Currently one such important service is the E-911 emergency positioning functionality that is regulated for the US market. So-called E-911 phase 2 positioning requirements specify that all cellular networks have to be able to position users within 30 s, with accuracies better than 150 m (95%) and 50 m (67%), as counted for each county and each emergency center (PSAP). Considering the fact that GPS (Global Positioning System) receivers have very limited coverage indoors and the fact that most cell phone calls are placed indoors, these are very difficult requirements. The consequence is that the LTE cellular system standardizes not only GPS, but actually assisted Global Navigation Satellite System (A-GNSS) which is an enhancement of several of the coming and existing satellite navigation systems (of which GPS is one example). On top of that, a number of alternative positioning methods that rely on cellular network measurements are standardized in LTE, the details of these positioning methods are described below.

Emergency positioning requirements are also under way in other regions, like e.g. India; however, in markets outside the US, cell phone positioning is primarily used for commercial location based services such as personal and vehicular navigation, friend finding and geographical search services. Lawful surveillance and intercept are other situations where location technology is particularly useful.

To support the positioning methods the entire cellular infrastructure is prepared for processing and signaling of geographical position information. In LTE most of the positioning related functionality resides in the so-called eSMLC (evolved-Serving Mobile Location Center) node.

In areas with relatively low expected density of LTE user equipment, the uplink UL coverage, rather than the DL capacity, is typically the limiting factor. The base station node and in particular the high power parts thereof are expensive pars of the communication access network and in order to save costs a so-called Psi-coverage configuration can be used. In such a configuration, a single eNodeB is connected to three standard cross-polarized sector antennas. The downlink (DL) signals are divided onto the three antennas. The connection is made via two specially designed 3-way splitter-combiners. In this way, a maintained DL coverage can be obtained but with one eNodeB instead of three. However, to maintain the performance, the uplink UL signals are received from multiple antenna branches and combined into one radio unit, using different frequencies for different sectors, thereby reducing interference and noise. The interference between the combined signals originating from different antennas can therefore be reduced. This results in an UL sensitivity comparable to an ordinary 3-sector configuration. Compared to an omni configuration the UL capacity is substantially improved.

Since Psi-coverage maps the UL and DL into one omni sector-cell, the radio network controller views the configuration as a high capacity and high coverage omni-sector cell. In other words, the Psi-coverage approach involves an omni base station with three antennas, stripped of some but not all three-sector functionality. It is intended to have a very low cost and good coverage. This allows the normal functioning of most RAN (Radio Access Network) features. However, the positioning capabilities are limited, as only one cell area per omni sector-cell is defined for the positioning. In other words, the sector information is lost for positioning. Since a plurality of positioning methods in LTE rely on sector information to maintain accuracy, this has a large negative effect on the positioning accuracy. The same is valid for the closely related so-called Y-coverage wherein one eNodeB is connected to two sector antennas.

Therefore, there is a need for methods of improving the accuracy of positioning for Psi-coverage or Y-coverage configurations.

SUMMARY

The present disclosure aims to obviate some of the above-mentioned problems, and to provide methods and arrangements according to the included independent claims. Preferred embodiments are defined by the dependent claims.

In a first aspect, a method of reporting hidden sector information from a base station node in a wireless communication system, said base station node being an omni base station node with an internal multi-sector structure that is hidden from the rest of the system, and said hidden sector information comprising sector information of said multi-sector structure that is hidden from the rest of the system and only internally available in said omni base station, comprises obtaining, in the base station node, enhanced cell-ID measurements associated with a first user equipment communicating with the base station node. Subsequently, the obtained enhanced cell-ID measurements is formatted, in the base station node, into information elements of a measurement report, each such information element comprising a plurality of symbols. Hidden sector information for the first user equipment is retrieved, in the base station node, which hidden sector information comprises an indication of an antenna sector of the base station in which the first user equipment is located. The retrieved one of dormant and latent sector information is encoded, in the base station node, using at least one selected symbol of the plurality of symbols of the measurement report to provide a transformed measurement report. Finally, the transformed measurement report is reported from the base station node.

In a second aspect, a base station node in a wireless communication system is provided. Said base station node being an omni base station node with an internal multi-sector structure that is hidden from the rest of the system, the base station node comprises an enhanced cell-ID measurement obtainer, a formatter, a sector information retriever, an encoder and a reporting unit. The enhanced cell-ID measurement obtainer is configured for obtaining enhanced cell-ID measurements associated with a first user equipment communicating with the base station node. The formatter is configured for formatting the obtained enhanced cell-ID measurements into information elements of a measurement report, each such information element comprising a plurality of symbols. The sector information retriever is configured for retrieving hidden sector information for said first user equipment, said hidden sector information comprising an indication of an antenna sector of said base station node in which said first user equipment is positioned. The encoder is configured for encoding the retrieved hidden sector information using at least one selected symbol of the plurality of symbols of the measurement report to provide a transformed measurement report. Finally, the reporting unit is configured for reporting the transformed measurement report.

In a third aspect, a method of positioning of a first user equipment in a wireless communication system, comprises receiving at least one transformed measurement report from a base station node, which transformed measurement report comprising formatted enhanced cell-ID measurements associated with the first user equipment and hidden sector information comprising an indication of an antenna sector of the base station node in which the first user equipment is located. Said base station node is an omni base station node with an internal multi-sector structure that is hidden from the rest of the system, and said hidden sector information comprising sector information of said multi-sector structure that is hidden from the rest of the system and only internally available in said omni based station. Subsequently, retrieving the enhanced cell-ID measurements and hidden sector information from the measurement report, and estimating a position of the first equipment based on the enhanced cell-ID measurements and the retrieved hidden sector information.

In a fourth aspect, a positioning node in a Long Term Evolution (LTE) wireless communication system comprises a receiver, a retriever, and an estimator. The receiver is configured for receiving a measurement report concerning a first user equipment communicating with a base station node in the system, which measurement report comprising enhanced cell-ID measurements associated with the first user equipment, and hidden sector information comprising an indication of an antenna sector of the base station node in which the first user equipment is located. Said base station node being an omni base station node with an internal multi-sector structure that is hidden from the rest of the system, and said hidden sector information comprising sector information of said multi-sector structure that is hidden from the rest of the system and only internally available in said omni base station. The retriever is configured for retrieving the enhanced cell-ID measurements and the hidden sector information. The estimator is configured for estimating a position of the first user equipment based on the enhanced cell-ID measurements and the hidden sector information.

One advantage of the present disclosure includes enabling signaling hidden sector information from a base station node to a positioning node and thereby increasing the accuracy of positioning methods in the positioning node. In addition, no changes to a current standard is necessary since no additional signaling is introduced. Further advantages are described in connection with different embodiments in the detailed description below.

BRIEF DESCRIPTION OF THE DRAWINGS

The invention, together with further objects and advantages thereof, may best be understood by referring to the following description taken together with the accompanying drawings, in which.

ABBREVIATIONS

Figure 1:
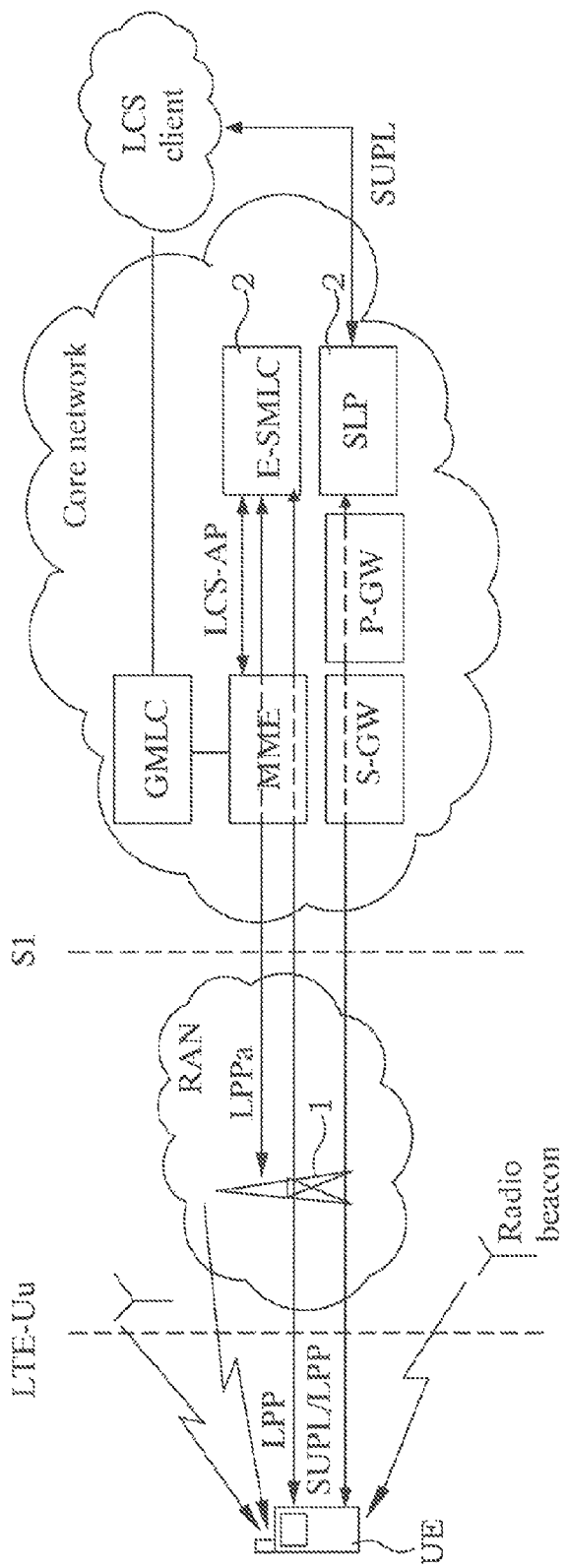
FIG. 1 is a schematic illustration of the positioning architecture in LTE.

3GPP Third Generation Partnership Project
AoA Angle of Arrival
A-GPS Assisted-Global Positioning System
A-GNSS Assisted-Global Navigation Satellite System
DL DownLink
e-SMLC evolved-Serving Mobile Location Center
GMLC Gateway Mobile Location Centre
GNSS Global Navigation Satellite System
GPS Global Positioning System
LCS LoCation Service
LPP LTE Positioning Protocol
LPPa LTE Positioning Protocol annex
LTE Long Term Evolution
OTDOA Observed Time Difference Of Arrival
P-GW Packet data network GateWay
RSSI Received Signal Strength Indicator
RTT Round Trip Time
SET SUPL Enabled Terminal
SPC SUPL Positioning Center
SUPL Secure User Plane Location
SLC Service Location Controller
SLP Service Location Protocol
TA Timing Advance
WCDMA Wideband Code Division Multiple Access
UE User Equipment
UL UpLink

DETAILED DESCRIPTION

Throughout the drawings, the same reference numbers are used for similar or corresponding elements. Although mainly described in the context of a LTE system, the present disclosure is equally applicable to similar systems e.g. WCDMA (Wideband Code Division Multiple Access).

The design and configuration of communication systems of today are to a large portion determined by different standards. The standards are intended to assist in making the systems interoperable also when using nodes from different vendors and to make the system backwards compatible to a certain degree. One of the disadvantages with the standardization work is that new ideas requiring changes in the standard are not very easily introduced.

To further aid the understanding of the underlying architecture behind the current disclosure, a brief description of the LTE positioning architecture will be described below.

The general outline of a high-level architecture of the current standard for LTE positioning will be described with reference to FIG. 1. Three of the key network elements in the LTE positioning architecture are the LCS (LoCation Service) Client, the LCS target e.g. user terminal, and the LCS Server e.g. an E-SMLC or an SLP (Service Location Protocol). The SLP may comprise two components, SPC and SLC (Service Location Controller), which may also reside in different nodes. SLC is responsible for coordination and administrative functions to provide location services, while the SPC is responsible for the positioning function. In an example implementation, SPC has a proprietary interface with E-SMLC, and LLP interface with SLC, and the SLC part of SLP communicates with P-GW (PDN-Gateway) and External LCS Client.

The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for obtaining location information for one or more LCS targets, i.e. the entities being positioned. LCS Clients may reside in the LCS targets themselves. An LCS Client sends a request to LCS Server to obtain location information, and LCS Server processes and serves the received requests and sends the positioning result and optionally a velocity estimate to the LCS Client. A positioning request can originate from the terminal or the network.

Two of the positioning protocols operating via the radio network exist in LTE, namely LPP (LTE Positioning Protocol) and LPPa (LPP annex). The LPP is a point-to-point protocol between a LCS Server and a LCS target device, used in order to position the target device. LPP can be used in both the user and control plane, and multiple LPP procedures are allowed in series and/or in parallel thereby reducing latency. LPPa is a protocol between eNodeB and LCS Server specified only for control-plane positioning procedures, although it still can assist user-plane positioning by querying eNodeBs for information and eNodeB measurements. SUPL protocol may be used as a transport for LPP in the user plane. In the user plane with SUPL, a UE is typically referred to as SUPL Enabled Terminal (SET), the LCS platform is typically referred to as SUPL Location Platform (SLP).

Additional positioning architecture elements may also be deployed to further enhance performance of specific positioning methods. For example, deploying radio beacons is a cost-efficient solution that may significantly improve positioning performance indoors and outdoors by allowing more accurate positioning, for example, with proximity location techniques.

The interfaces in the above illustrated architecture are standardized and define what information can be exchanged and in what form. In most systems, a plurality of positioning methods are available utilizing various measured parameters related to signaling between a base station and a user equipment. To this end, the interfaces allow signaling of measurement reports comprising a plurality of symbols or bits representing the various parameters. As mentioned previously, for certain systems the base station is internally aware of dormant or hidden sector information which could be used to improve the accuracy of positioning. However, due to restrictions within the current standard, it is not possible to signal this hidden information to e.g. a positioning node or some other node in the system.

As an alternative to changes in the standard, the available information elements, symbols, or bits of the measurement reports can be used in an alternative manner. This approach is exploited by the present disclosure. It has been identified by the inventors that the accuracy of the measurements included in the measurement reports is unnecessarily high. By utilizing some of the symbols or bits of the measurement report, hidden sector information may be transmitted from the base station node to a positioning node.

Typically, UE measurements for UE-assisted positioning are transmitted over LPP and/or SUPL.

The positioning result may be signaled between:
LCS target and LCS server, e.g. over LPP protocol,
Positioning servers (e.g., E-SMLC and SLP), over standardized or proprietary interfaces,
Positioning server and other network nodes (e.g., E-SMLC and MME/MSC/GMLC/O&M/SON),
Positioning node and LCS Client (e.g., between E-SMLC and PSAP or between SLP and External LCS Client).

In the present disclosure proprietary signaling and new usage of existing signaling that allows a reporting of hidden sector information is provided. In a wireless communication system, bits of measurement reports comprising enhanced cell-ID measurements are used to encode hidden sector information associated with a user equipment in the message to the positioning node.

The embodiments below will for simplicity utilize the LTE system and its provisions for positioning as a basic system model. Antenna sector related information will be used as the hidden sector information in the described embodiments. These are the preferred embodiments, in which the advantages are believed to be most prominent. However, the ideas are not limited to such systems.

In order to fully understand the possibilities and advantages of the embodiments of the present disclosure described here below, one preferably needs some knowledge of the present standard positioning possibilities in LTE. Therefore, a brief LTE positioning method overview will follow below.

In wireless communication systems of today, in particularly in LTE systems, there are a number of positioning methods available for providing positioning of user terminals. Those positioning methods can be classified as belonging to one of high precision methods, or low and medium precision methods. To the first class, the methods of A-GPS and A-GNSS can be added, as well as OTDOA and UTDOA. The second class includes methods such as Cell ID positioning, TA (timing advance) positioning, RSSI (received signal strength) based positioning, AoA (Angle of Arrival) positioning, and fingerprinting positioning.

The dominating high-accuracy positioning method in almost all cellular systems today is the assisted GPS (A-GPS) method. LTE also standardizes a more general satellite positioning technology, denoted A-GNSS. This technology includes e.g. the European Galileo system. However, today and in the near future, A-GPS will dominate the market.

A-GPS is an enhancement of the global positioning system (GPS). GPS reference receivers attached to the cellular communication system collect assistance data that, when transmitted to GPS receivers in terminals connected to the cellular communication system, enhance the performance of the GPS terminal receivers. Additional assistance data is collected from the cellular communication system directly, typically to obtain a rough initial estimate of the position of the terminal together with a corresponding uncertainty of the initial estimate. A-GPS and A-GNSS is not within the primary scope of the present disclosure, although the result of the present disclosure is useful to provide more accurate assistance data for A-GPS and A-GNSS.

The LTE system also standardizes terrestrial time difference of arrival methods. These have lower accuracies than A-GNSS, but are still considered to belong to the class of high precision positioning methods. Essentially these methods measures the differences between arrival times of signals from hearable base stations (downlink—the OTDOA method), or differences between time of arrival times in RBSs that can hear a certain UE (uplink—the UTDOA method). Using well-known computations, these measurements can be used to form a nonlinear system of equations which solution gives the UE position. These methods are not within the primary scope of the present invention. However, as for A-GPS the results of the present disclosure may provide better initial positions as assistance data for OTDOA and UTDOA.

In the cell ID (CID) positioning the terminal position is determined with cell granularity and thus represents the back bone low end approach in the majority of the cellular systems, including LTE. The method has the advantage of an instantaneous response and availability wherever there is cellular coverage. In CID positioning the position of a UE is estimated with the knowledge of its serving eNodeB and cell. The information about the serving eNodeB and cell may be obtained through mobility procedures for mobiles in either active or idle mode, for example, by paging and tracking area update. Since the UE may be anywhere in the cell, estimation accuracy depends on the cell size and can be very poor in cells with large coverage area. Enhanced CID positioning refers to techniques, which use additional UE and/or E-UTRAN radio resource and other measurements to improve the UE location estimate.

The CID method typically exploits cell polygons [1] to describe the extension of each cell of the cellular system. The 3GPP polygon format consist of a list of 3-15 corners, each corner being represented by an encoded latitude and longitude, in the WGS 84 system [1]. When connected by line segments, the corners define a cell polygon, which represents the cell boundary. Certain rules apply; line segments between corners are e.g. not allowed to cross. The cell polygons can be computed by coverage computation tools, which account for cell layout and topographical information. It is essential to understand that the cell polygons are statistical descriptions. This means that there is a certain probability that the terminal is actually located within the reported cell polygon. This is known as the confidence value.

Positioning methods that use the wireless network can be grouped in two main groups. The first group comprises methods that are based on the cell to which a mobile terminal is attached, e.g. by using CID or a combination of CID and other measurements e.g. timing advance (TA) measurements. Due to the advantages of the CID method, attempts have been made to enhance the accuracy, while maintaining the benefits. One ways is to augment the CID method with an assessment of the TA, i.e. the travel time back and forth between the terminal and the base station. Together this defines a truncated circular strip around the base station, denoted an ellipsoid arc in [1].

Figure 2:
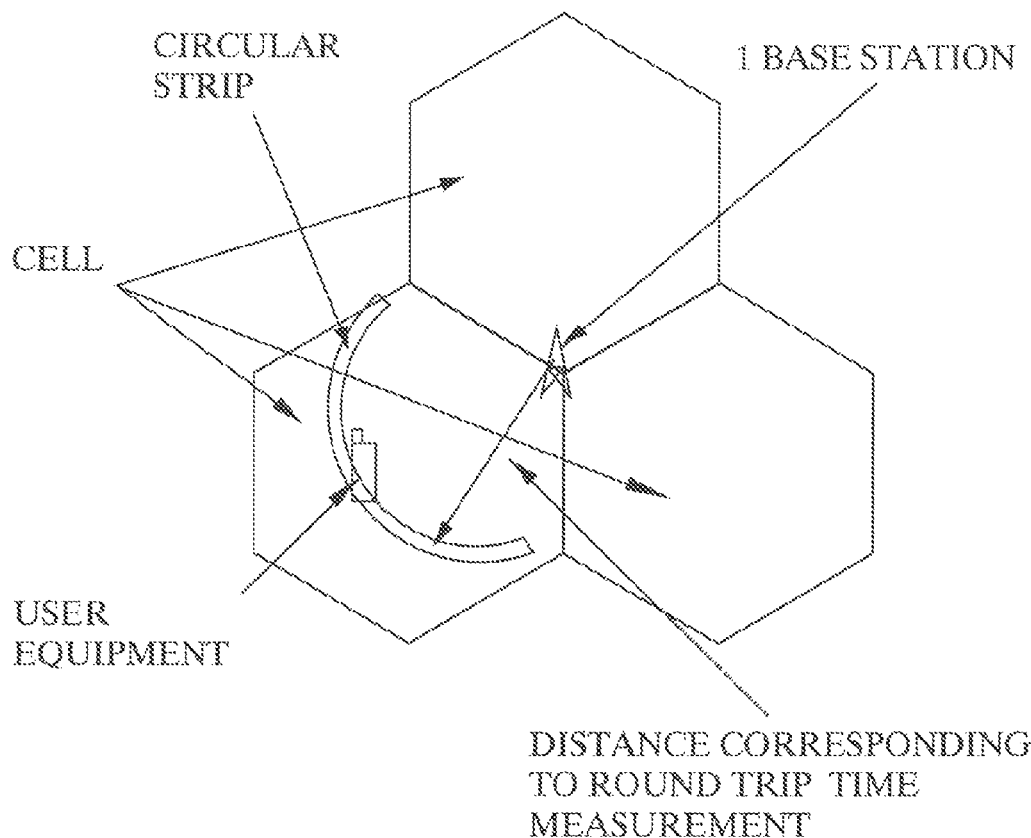
FIG. 2 illustrates a positing method in LTE.

The CID+TA positioning method and measurement principle is depicted in FIG. 2. Briefly, the travel time of radio waves from the eNodeB to the UE and back is measured. The distance from eNodeB to UE then follows from the formula:

$$r = c\frac{TA}{2}$$

where TA is the timing advance and where c is the speed of light. The TA alone defines a circle, or if the inaccuracy is accounted for, a circular strip around the eNodeB. By combining this information with the cell polygon. left and right angles of the circular strip can be computed.

Another approach is to use signal strength measurements performed in the UE. The UE performs measurements of the received signal strength (RSSI) in many situations. These measurements are performed against a number of neighbor eNodeBs. Since the signal strength decreases with the distance, it is clear that the received signal strength is a measure of the distance to the transmitting base station. Unfortunately, signal strength measurements are subject to fast and slow fading that makes the distance measure obtained from these measurements quite inaccurate. However, combination of many measurements and triangulation between multiple eNodeBs together with advanced signal processing can give quite accurate position estimates.

A further approach is to use angle of arrival measurements (AoA). The AoA measurement standardized for LTE is defined as the estimated angle of a UE with regard to a reference direction, which is set to be the geographical north, positive in the counter-clockwise direction. AoA can reduce the angular uncertainty as compared to CID+TA positioning if combined with TA, as illustrated in FIG. 3.

Figure 3:
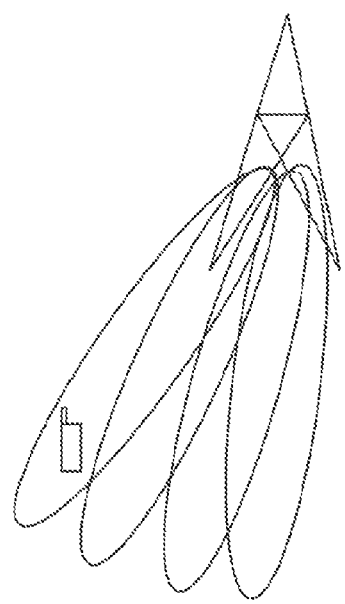
FIG. 3 illustrates a further positioning method in LTE.

It is clear from FIG. 3 that in order to apply AoA positioning it is necessary to know the eNodeB position; the antenna bore sight direction with regard to north as well as the antenna direction and lobe width. It is possible to configure these in the eNodeB—however it is also obvious that when CID+AoA positioning is used, the lobe width associated with a sector is needed to compute the left and right angles. By definition, the AoA is given with regard to north, counter clockwise.

Another positioning approach is provided by so-called fingerprinting positioning. Fingerprinting positioning algorithms operate by creating a radio fingerprint for each point of a fine coordinate grid that covers the Radio Access Network (RAN). The fingerprint may e.g. consist of The CIDs that are detected by the terminal, in each grid point.
Quantized signal strength measurements, with regard to multiple eNodeBs, performed by the terminal, in each grid point. An associated ID of the eNodeB may also be needed.
Quantized TA, in each grid point. An associated ID of the eNodeB may also be needed.
Quantized AoA information.

Whenever a position request arrives to the positioning method, a radio fingerprint is first measured, after which the corresponding grid point is looked up and reported. This of course requires that the point is unique.

The database of fingerprinted positions can be generated in several ways. A first alternative would be to perform an extensive surveying operation that performs fingerprinting radio measurements repeatedly for all coordinate grid points of the RAN. The disadvantages of this approach include the surveying required becomes substantial also for small cellular networks, and the radio fingerprints are in some instants (e.g. signal strength) sensitive to the orientation of the terminal, a fact that is particularly troublesome for handheld terminals. For fine grids, the accuracies of the fingerprinted positions therefore become highly uncertain. This is unfortunately seldom reflected in the accuracy of the reported geographical result.

Another approach, applied e.g. in Adaptive Enhanced Cell IDentity positioning (AECID) is to replace the fine grid by high precision position measurements of opportunity, and to provide fingerprinting radio measurements for said points. This avoids the above drawbacks, however algorithms for clustering of high precision position measurements of opportunity needs to be defined, and algorithms for computation of geographical descriptions of the clusters need to be defined. The above two problems are solved by previous patent applications on the AECID positioning method.

All the above methods, suffer from lack of accuracy for those cases e.g. Psi- or Y-coverage, when the positioning node and positioning algorithms do not have access to the internally hidden sector information of the base station node with which the user equipment is communicating.

Figure 4:
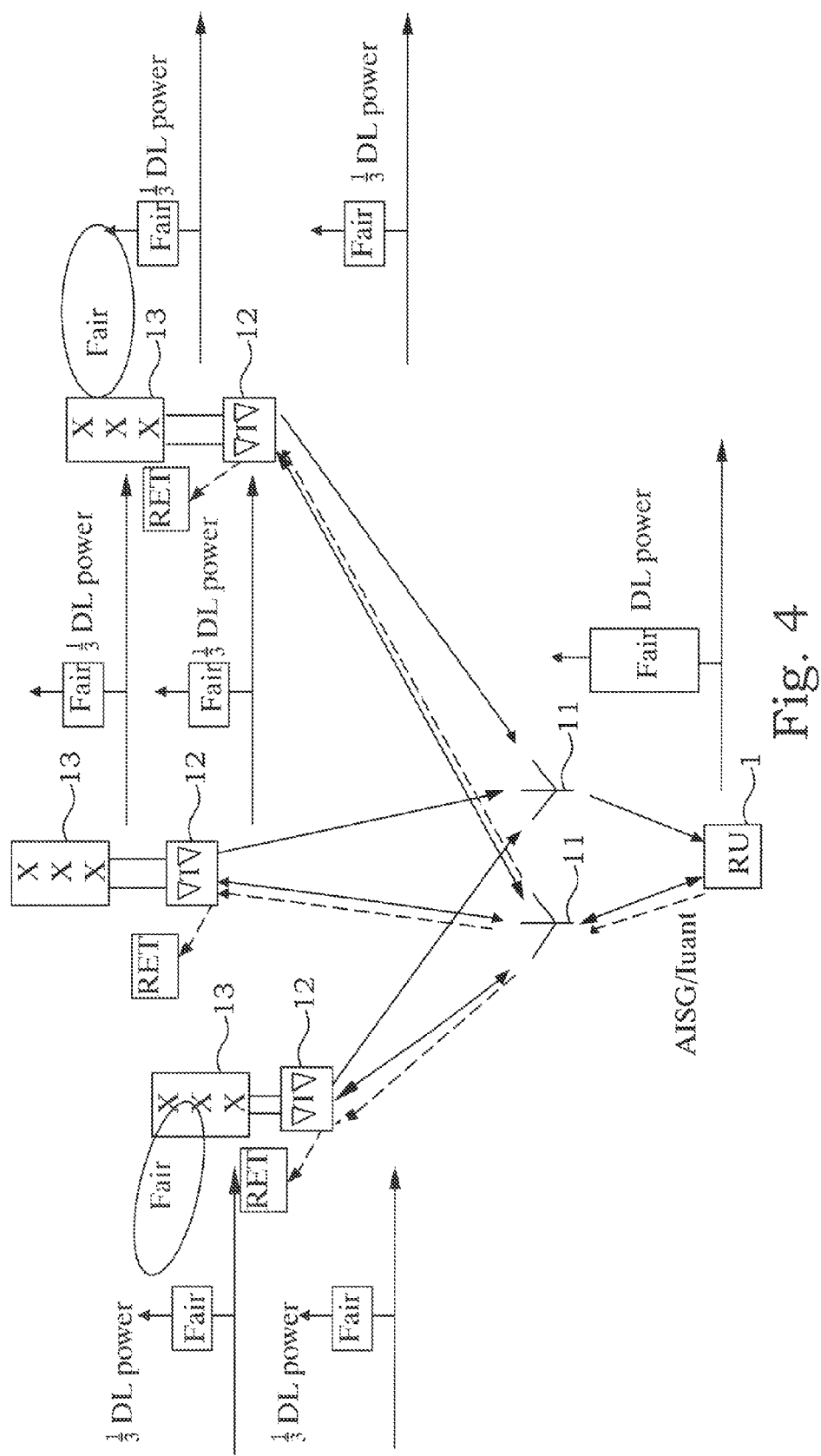
FIG. 4 illustrates downlink signaling in a Psi-coverage system.

In order to provide further understanding of the benefits of the present invention, the principles of the Psi-coverage base station will be described below with reference to FIG. 4 and FIG. 5.

Essentially, and as mentioned briefly in the background section if this disclosure, a Psi-Coverage base station is an omni base station, stripped of some but not all three-sector functionality. It is intended to have a very low cost, and good coverage aiming for development regions like India and Africa. Potential means to achieve this is described below; here it is sufficient to state that the main idea is to keep the three-sector structure internally in the UL of the Psi-Coverage base station node, while hiding this to the rest of the RAN, treating it as an omni—eNodeB. The DL uses a pure omni radio setup, but with three sector antennas. This means that the sector information is lost for positioning, although it is available internally in the eNodeB, something that makes important positioning methods in LTE at least three times less accurate as when this restriction is not in place. Other positioning methods in LTE cannot be applied at all in the Psi-coverage eNodeB. These bleak predictions follow since only one cell ID (CID) is associated with the omni eNodeB (per frequency).

The detailed reason for this is that the positioning protocols of LTE are not prepared to carry sector information in other forms than in the form of cell ID. It is not yet determined exactly how the Psi-Coverage eNodeB will work; it may be that sector information will be signaled in terms of sector frequencies in LTE. However, this is NOT the case over the positioning protocols that are terminated in the positioning node, the eNodeB and the UE.

Basically, Psi-Coverage boosts the coverage of a single radio configuration, enabling it to provide like-for-like coverage with GSM for a limited number of LTE subscribers. The use of a single radio unit reduces the CAPEX and maximizes the usage of the radio capabilities. As illustrated in FIG. 4, Psi-Coverage is used when a single eNodeB 6000 radio 1 is connected to three standard cross-polarized sector antennas 13. The connection is made via two specially designed 3-way splitter-combiners 11. One TMF (Frequency Shifting double TMA) 12 is installed between each antenna 13 and the splitter-combiners 11. In the downlink the base station works as in any other splitter/omni site. The same carrier, scrambling code and ⅓ of the transmitted power is provided at each of the three sector antennas; see FIG. 4, as indicated by $F_{air}$.

Figure 5:
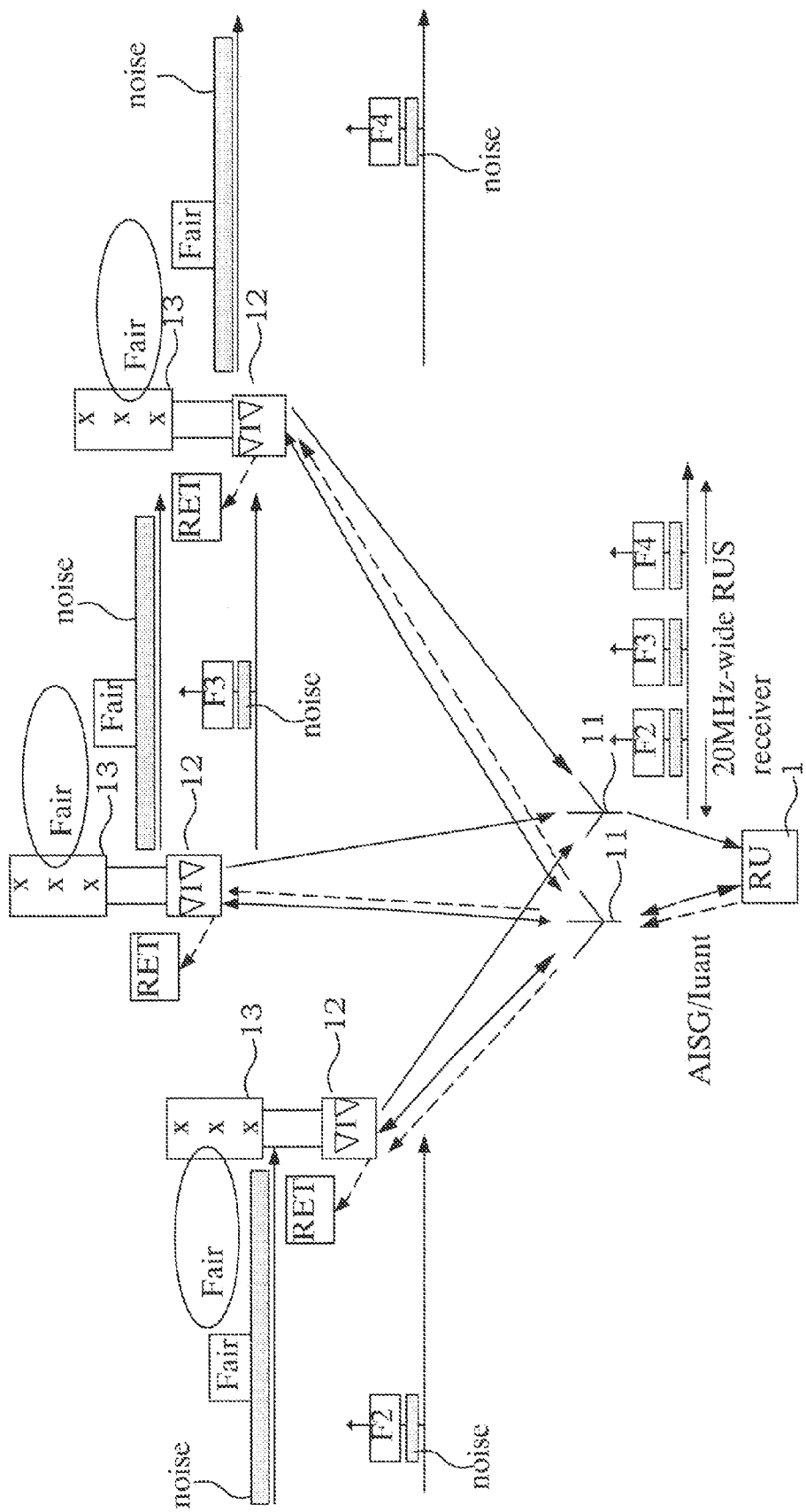
FIG. 5 illustrates uplink signaling in a Psi-coverage system.

In the uplink UL, with reference to FIG. 5, the Psi-Coverage has 5 dB UL gain when compared to a 3-antenna splitter omni site, thanks to the frequency shift of the received signal on each TMF, as indicated by the respective F2, F3, F4 of the three antennas.

To maintain the performance, the uplink UL signals are received from multiple antenna branches 13 and combined into one radio receiver 1. The SW feature enables decoding to offset the losses in the splitter-combiner 11. The SW feature also reduces the interference between the combined signals originating from different antennas. This results in an uplink sensitivity comparable to an ordinary 3-sector configuration, and uplink capacity improvements with respect to an omni configuration.

Figure 6:
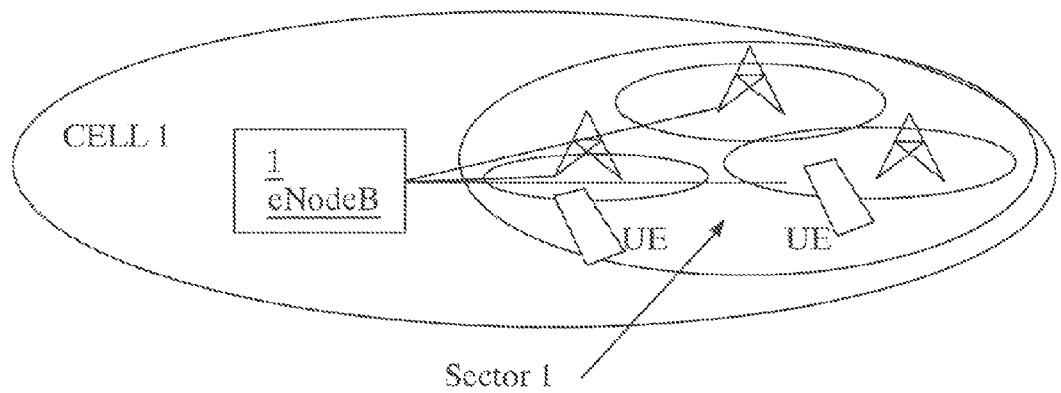
FIG. 6 illustrates the site modeling in a Psi-coverage system.
Figure 7:
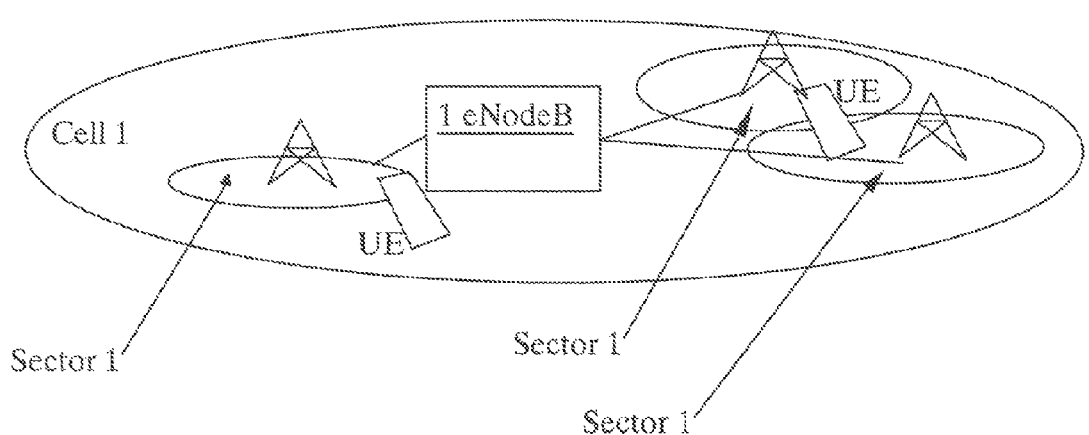
FIG. 7 illustrates a sectorized cell based system.

Consequently, Psi-Coverage maps the downlink and uplink in one cell with one sector (SectorEquipmentFunction [2],[1]. The site is modeled as shown in FIG. 6 where sectorization is internally resolved with only one sector in the cell (one logical cell-ID) instead of doing it like in FIG. 7 with a sectorized cell. This avoids the impact on the rest of the system required to resolve separate sectors (SectorEquipmentFunction instances) within the same logical Cell-ID. A Psi-Coverage cell therefore represents a high capacity and high coverage E-UTRAN cell, mapped onto a single sector (SectorEquipmentFunction instance). This allows the normal functioning of other RAN features but limits the positioning accuracy, as the region where the UE might be located becomes three times bigger.

Figure 8:
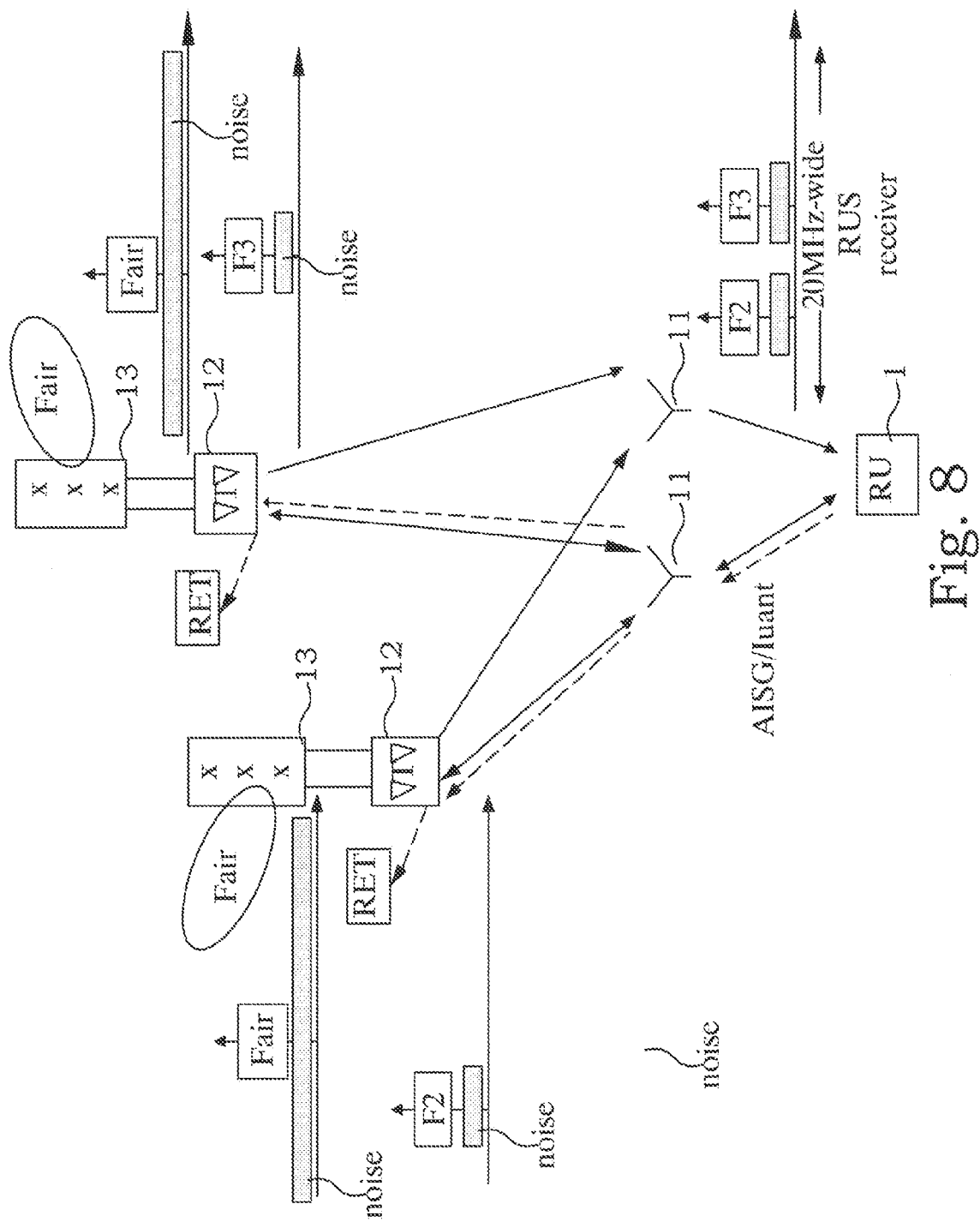
FIG. 8 illustrates uplink signaling in a Y-coverage system.

Another closely related solution is the Y-Coverage which corresponds to, with reference to FIG. 8, a reuse of the Psi-Coverage concept in sites where line-like coverage is enough i.e. along highways. Y-Coverage is used when a single eNodeB 6000 radio 1 is connected to two standard cross-polarized sector antennas 13 oriented in different directions. The connection is made via two specially designed 2-way splitter-combiners 11. One TMF (Frequency Shifting double TMA) 12 is installed between each antenna 13 and the splitter-combiners 11. A Y-Coverage cell therefore represents a cell, which limits the positioning accuracy in a similar way as presented above. The UL of Y-Coverage has 3 dB UL gain when compared to a 2-antenna splitter Coverage site, thanks to the frequency shift of the received signal on each TMF Although not presently anticipated, the same reasoning could be applied to a base station node comprising a single radio unit connected to a plurality of cross-polarized sector antennas via a single splitter/combiner.

As mentioned previously, for the case of Psi- or Y-coverage base stations, the base station is viewed as an omni base station by the rest of the communication system. Thereby, the base station, although aware of all sector information of itself, is unable to communicate this information to the rest of the system; in essence, it hides the sector information. This in turn causes a degradation of the precision of positioning methods that to some degree rely on the sector information. One common problem with the above mentioned positioning methods when applied in a Psi- or Y-coverage scenario is that due to lack of sector information, their precision is reduced to approximately a third compared the situation with a "normal" base station with full sectorization. In particular, for the case of RSSI positioning, since the measured received strength is a measure of the distance from the receiving user terminal to the transmitting base station, lack of sector information will only enable providing the position within a 360-degree circular strip centered around the transmitting site. Similarly, for the case of AoA positioning, the lack of sector information will imply a lack of an antenna boresight direction, which will essentially render the AoA positioning method useless. In addition, for the case of TA positioning the angular extension of the circular strip will be 360 degrees rather than 180 degrees and the regions where the UE may be located becomes three times as large as if the sector of the UE would be known to the position calculation function of the positioning node.

Figure 9:
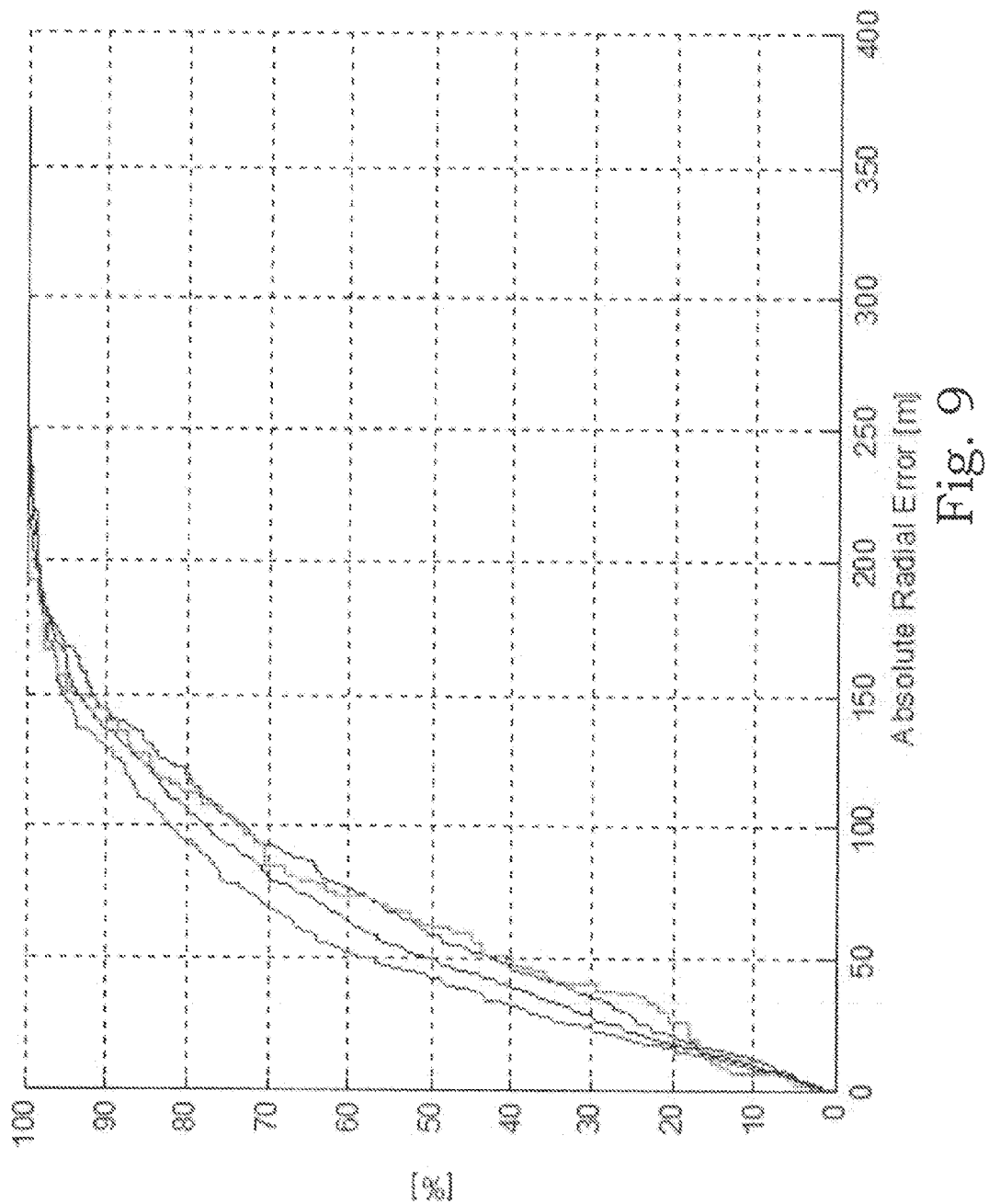
FIG. 9 discloses cumulative distribution of absolute radial error in all radio environments.

To understand the possibility of this signaling it is useful to study FIG. 9 that shows results of field trials of the RTT positioning algorithm of the closely related WCDMA system. The diagram illustrates the cumulative distribution of the absolute radial error in all radio environments. Solid lines represent the results with all measurements from all terminals included. Dotted lines show results for each terminal type. It can e.g. be seen that only 10% of the positioning have accuracy better than 8 m (5% better than 4 m). Hence, accuracy impairments at that level are not noticeable for RTT positioning performance. Then consider the RTT measurement resolution. This resolution is $1/16^{th}$ of a chip. Since one chip single way corresponds to 78 m at 3.84 MHz, $1/16^{th}$ of a chip corresponds to 4 m. Since the RTT measurement is divided by 2 in the position calculation, the distance associated with the least significant bit of the RTT measurement is 2 m.

Turning the attention to the LTE system, the resolution of TA is about 10 m, i.e. of the same order as the resolution of the RTT measurement in WCDMA. Furthermore, since radio propagation errors (non-LOS and multipath) affect WCDMA RTT positioning significantly already at a 3.84 MHz bandwidth, it is clear that TA based positioning in LTE will not gain substantially as compared to FIG. 9. The conclusion is that it will not affect the LTE TA positioning accuracy significantly in case the 2 least significant bits (corresponding to 20 m) are used for encoding of the sector information of the Psi-Coverage eNodeB. Note that this means that there will not be any problems in multi-vendor situations—the minor inaccuracy impairment will pass unnoticed!

Although described in the context of selecting least significant bits, it is equally viable to select a most significant bit or any other bit, which is determined at each moment in time. Depending on the situation in the network there may arise situations where providing accurate positioning is more important than providing a certain number of digits for the measurement reports. For example, in certain areas the coverage of a cell may be much smaller than the maximum range that is possible to report in the measurement report. This means that the most significant symbols or bits always are represented by zeros. If the positioning node is configured to be aware of that the most significant bits always are zero, these bits can be used for encoding the hidden sector information. It is also possible to use combinations of least significant bits and most significant bits, or bits of any predetermined significance.

Based on the above, the inventors have identified a method of providing the hidden sector information without necessitating a change in the standardized signaling protocol. Below follows, a brief summary of the problems associated with each positioning method when using a Psi- or Y-coverage base station.

Since the Psi-coverage, and Y-coverage eNodeBs are internally aware of the sector where the UE is located, but hide this to the nodes beyond it, the nodes beyond it will only be aware of one cell circumventing the Psi-coverage eNodeB (an omni cell). For the case of CID positioning, the accuracy will be reduced since the cell ID is needed in order to pinpoint the sector of a multi-sector site, e.g. a three-sector site.

Further, for the case of single leg CID+RSSI positioning, the accuracy will be reduced since the angular extension of the ellipsoid arc will be 360 degrees rather than about 120 degrees and the regions where the UE may be located becomes 3 times as large as if the sector of the UE would be known to the position calculation function of the eSMLC node. This represents a huge increase of the inaccuracy of the CID+RSSI positioning method, with a factor of 3, as compared to the case where the sector information is known by the eSMLC. This may have severe implications on the US market where the Psi-coverage eNodeBs could become an alternative in sparsely populated regions. For the purpose of the present disclosure it is noted that in the case of a single leg CID+RSSI positioning, the cell ID is needed in order to pinpoint the sector of a multi-sector site that is transmitting (e.g. a three sector site)—otherwise the UE location can only be determined to be within a 360 degree circular strip centered around the transmitting site.

In addition, the previously described CID+AoA positioning will need antenna bore sight directions and lobe widths for each sector, or there will be a 360 degree ellipsoid arc instead of a much smaller angular extension. This may have severe implications on the Chinese market where the Psi-Coverage eNodeBs could become an alternative. The reason is that several Chinese operators are promoting antenna systems with up to 8 elements. For the purpose of the present disclosure it is noted that the cell ID is needed in order to pinpoint the sector of a multi-sector site, in order to enable looking up the lobe width associated with the sector (which may not be the same for all sectors due to the cost of multiple element antennas).

Further, for AECID fingerprinting positioning, which combines CID, TA, AoA and signal strength will experience a significant accuracy reduction, at least with a factor of three.

Figure 10:
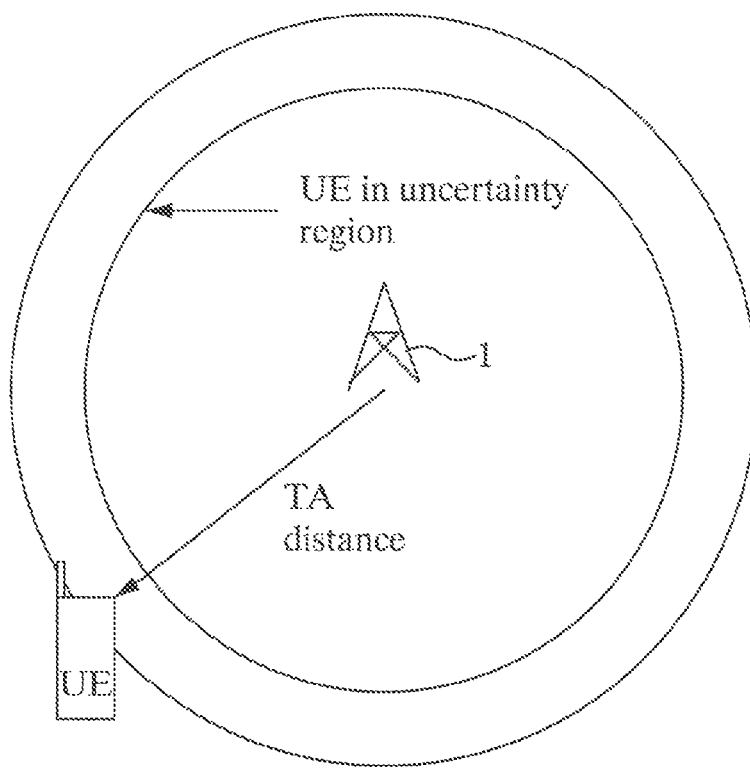
FIG. 10 illustrate a positioning the method without the advantage of providing sector information.
Figure 11:
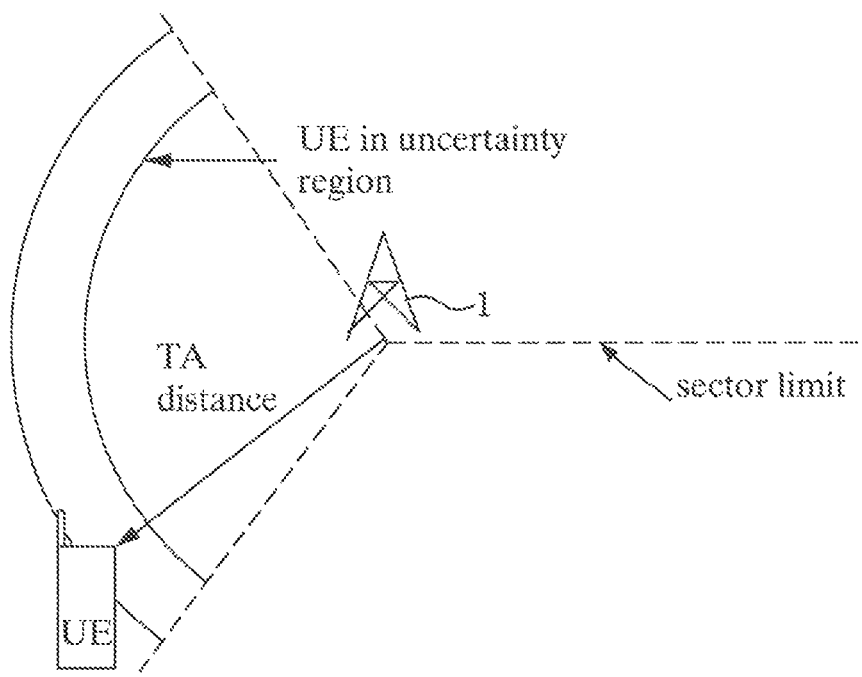
FIG. 11 illustrates the benefits of the present disclosure over FIG. 10.

Finally, for the case of a combination of CID+TA positioning, the accuracy will be reduced since the angular extension of the ellipsoid arc will be 360 degrees rather than about 120 degrees and the regions where the UE may be located becomes 3 times as large as if the sector of the UE would be known to the position calculation function of the eSMLC. This represents a huge increase of the inaccuracy of the CID+TA positioning method, with a factor of 3. For the purpose of the present disclosure, it is noted that the cell ID is needed in order to pinpoint the sector of a multi-sector site, e.g. a three-sector site. Otherwise, the CID+TA positioning method will result in a 360 degree circular strip around the eNodeB. The benefits of providing the sector information is illustrated in FIG. 10 and FIG. 11, in which the first drawing illustrates the CID+TA without sector information, and the second drawing illustrate CID+TA with sector information. The benefits are clearly visible.

In order to make the Psi- and Y-coverage base stations a viable solution with attractive positioning accuracy, the inventors have identified a method enabling a base station to reveal or signal the hidden sector information to a positioning node without necessitating a change to a current standard. One other possibility would be to introduce new signaling that goes beyond the standardized protocols of today, which would require a change to the present standards. However, as identified by the inventors, it is possible to utilize already existing signaling protocols to provide the hidden sector information. The inventors have identified the possibility to "steal" symbols or bits of already existing measurement reports and utilizing those symbols or bits to encode the hidden sector information. By selecting which bits or symbols to use, it is possible to do this without affecting the accuracy of the measurement reports.

As stated previously a main idea of the disclosure is to exploit the fact that the sector of the UE is known in the Psi-Coverage base station although it cannot be used in prior art LTE positioning algorithms—since the Psi-Coverage eNodeB appears as one cell for the nodes beyond it. The way to exploit the sector information is to introduce new proprietary signaling from the eNodeB to the eSMLC and to disclose means to make the information useful for positioning purposes, in the eSMLC.

Figure 12:
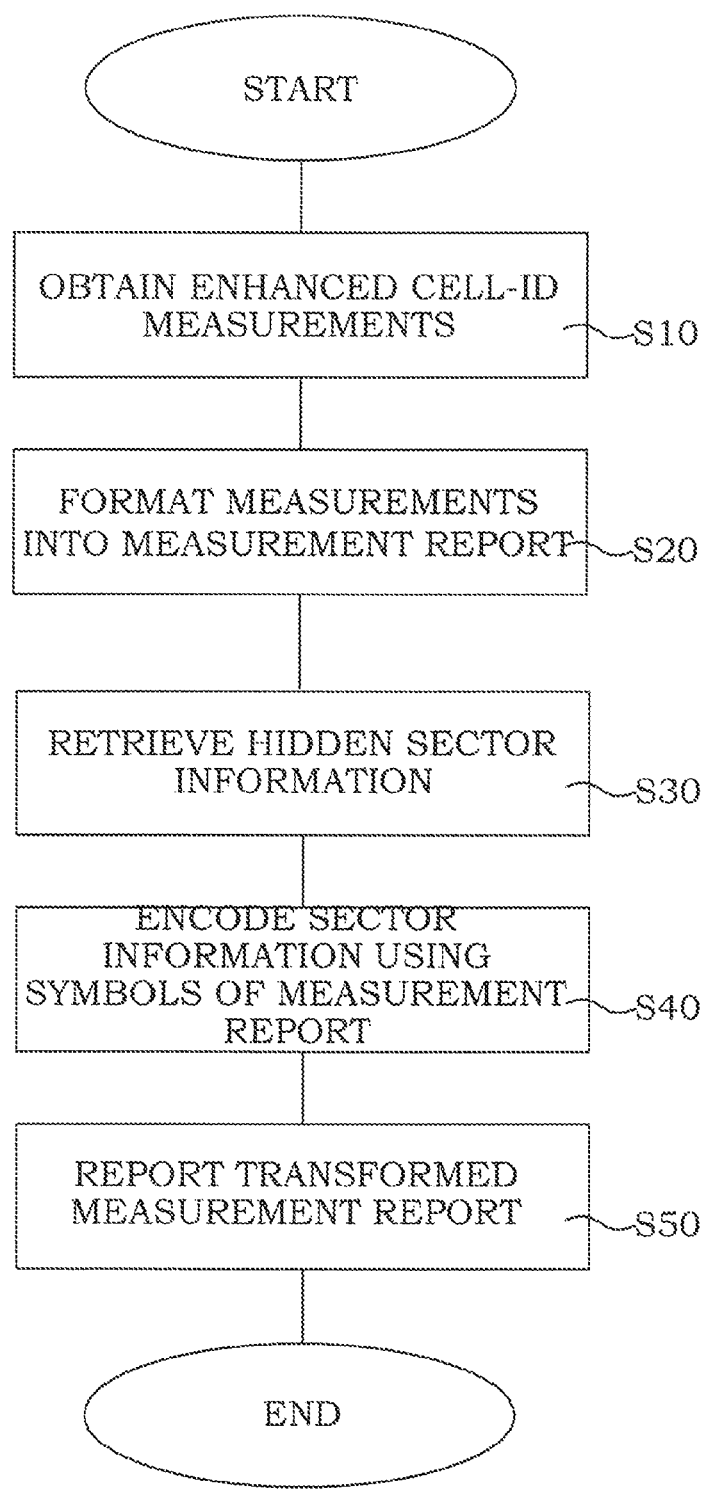
FIG. 12 illustrates an embodiment of a method in a base station node according to the present disclosure.

With reference to FIG. 12 an embodiment of a method according to the present disclosure will be described. The method is described with reference to a wireless communication system in which a plurality of user equipment are in communication with one or more base station nodes. The base station nodes are configured to utilize Psi- or Y-coverage, and thereby to hide any available sector information from the rest of the system. Initially, enhanced cell-ID measurements associated with a first user equipment communicating with at least one base station node is obtained S10 in the base station node. The obtained measurements are either generated e.g. measured in the base station node, or generated in some other node e.g. UE in the network and subsequently signaled to and received (and obtained) in the base station node. The obtained measurements are subsequently formatted S20 into information elements of a measurement report. The information elements consist of a plurality of symbols or bits. Then the base station node retrieves S30 dormant or hidden or latent sector information for the first user equipment, which information provides an indication of in which antenna sector of the base station the user equipment resides in. The retrieved sector information is then encoded S40 using at least one selected symbol of the measurement report to provide a transformed measurement report, and the transformed measurement report is finally transmitted S50.

In a further embodiment, the enhanced cell-ID measurements comprise an indication of a received signal strength from the base station node in the first user equipment, and/or an indication of an angular orientation of the user equipment relative a predetermined reference direction. The angular orientation can be provided as an angle of arrival (AoA) relative the predetermined reference direction e.g. geographical north.

In an additional embodiment, the hidden or dormant sector information comprises at least sector identifying information associated with the antenna sector and/or an ID.

The enhanced cell-ID measurements can be generated by the first user equipment and subsequently signaled to and obtained at the base station node, or be obtained in the base station node as a result of measurements performed by the base station node itself or some other node in the system.

In one embodiment, the selected symbol or symbols comprise the least significant bits of the measurement report. However, it is equally possible to utilize any available symbol(s) of the measurement report.

The basic concept of the disclosure discloses proprietary signaling that allows a reporting of the sector from the Psi-coverage eNodeB to the eSMLC, by using e.g. the least significant bits of one or more of the TA measurement report to encode the sector of the UE in the message to the eSMLC from the eNodeB.
the signal strength(s) report(s) to encode the sector of the UE in the message to the eSMLC from the eNodeB.
the AoA report to encode the sector if the UE in the message to the eSMLC from the UE.

The encoding of the hidden sector information can be performed according to the non-limiting example below.

TA Encoding

The interface between the eNodeB and the eSMLC is the LPPa interface, see FIG. 1. The first embodiment therefore steals two least significant bits (LSB) of the TA, signal strength and/or AoA information elements (or combinations thereof) and uses these for encoding of the Psi-Coverage sector information associated with the UE position. One embodiment uses:

Sector A: TA_LSB=0, TA_LSB+1 P=0.
Sector B: TA_LSB=1, TA_LSB+1=0
Sector C: TA_LSB=0, TA_LSB+1=1.

Other variants are of course also possible. The so modified and encoded TA measurement is then transmitted over the LPPa interface to the eSMLC. The eSMLC then decodes the information and interprets the two LSB as follows:

```
If (TA_LSB=0) & (TA_LSB+1=0)
    psiCoverageSector = Sector A
Elseif (TA_LSB=1) & (TA_LSB+1=0)
    psiCoverageSector = Sector B
Elseif (TA_LSB=0) & (TA_LSB+1=1)
    psiCoverageSector = Sector C
End
```

The eSMLC may without significant loss of accuracy use the received encoded TA measurement as is, or set LSB_0 and LSB_1 to 0.

RSSI Encoding

Since the resolution of signal strength information, here denoted RSSI information, is also better than the actual accuracy of this information, the TA technique can also be applied to RSSI signaling between the eNodeB and the eSMLC. One embodiment uses:

Sector A: RSSI_LSB=0, RSSI_LSB+1 P=0.
Sector B: RSSI_LSB=1, RSSI_LSB+1=0
Sector C: RSSI_LSB=0, RSSI_LSB+1=1.

Other variants are of course also possible. The so modified and encoded RSSI measurement is then transmitted over the LPPa interface to the eSMLC. The eSMLC then decodes the information and interprets the two LSB as follows:

```
If (RSSI_LSB=0) & (RSSI_LSB+1=0)
    psiCoverageSector = Sector A
Elseif (RSSI_LSB=1) & (RSSI_LSB+1=0)
    psiCoverageSector = Sector B
Elseif (RSSI_LSB=0) & (RSSI_LSB+1=1)
    psiCoverageSector = Sector C
End
```

The eSMLC may without significant loss of accuracy use the received encoded TA measurement as is, or set LSB_0 and LSB_1 to 0.

AoA Encoding

Since the resolution of angle of arrival information, here denoted AoA information, is also better than the actual accuracy of this information, the TA technique can also be applied to AoA signaling between the eNodeB and the eSMLC. One embodiment uses:

Sector A: AoA_LSB=0, AoA_LSB+1 P=0.
Sector B: AoA_LSB=1, AoA_LSB+1=0
Sector C: AoA_LSB=0, AoA_LSB+1=1.

Other variants are of course also possible. The so modified and encoded AoA measurement is then transmitted over the LPPa interface to the eSMLC. The eSMLC then decodes the information and interprets the two LSB as follows:

```
If (AoA_LSB=0) & (AoA_LSB+1=0)
    psiCoverageSector = Sector A
Elseif (AoA_LSB=1) & (AoA_LSB+1=0)
    psiCoverageSector = Sector B
Elseif (AoA_LSB=0) & (AoA_LSB+1=1)
```

-continued

```
            psiCoverageSector = Sector C
    End
```

The eSMLC may without significant loss of accuracy use the received encoded TA measurement as is, or set LSB_0 and LSB_1 to 0.

Subsequently, in a positioning node e.g. sSMLC node, using e.g. the least significant bits of the TA, signal strength and/or the AoA in the eSMLC, to decode the hidden sector information, by configuration of sector polygons, for each sector, of Psi-Coverage cells, and using sector polygons in the CID+TA and single leg CID+RSSI ellipsoid arc computation and reporting, in response to the signaled least significant bits of the TA, signal strength and/or AoA information message, and configuration of antenna lobe width, for each sector, of Psi-Coverage cells or Y-coverage cells.

Figure 13:
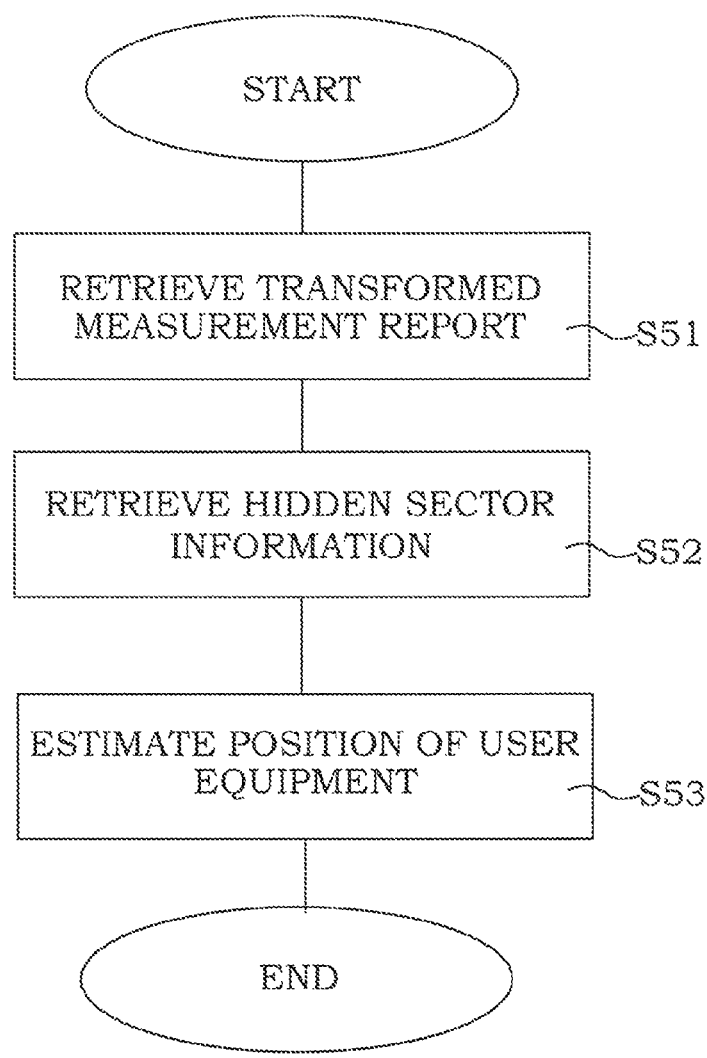
FIG. 13 illustrates an embodiment of a further method in a positioning node according to the present disclosure.

With reference to FIG. 13, an embodiment of a positioning method according to the present disclosure will be described. In a positioning node, a transformed measurement report is received S51 and the sector information is retrieved S52 together with the enhanced cell-ID measurements from the measurement report and a positioning method is applied. Consequently, the positioning node is configured to recognize the encoded hidden sector information and to utilize it to estimate S53 the position of the user equipment.

Another area where the present disclosure could be beneficial is the case where more than three sectors are utilized, e.g. beamforming.

When utilizing so called fingerprinting positioning, a combination of different positioning methods is used. In this case, multiple measurement reports are provided and it is possible to encode the hidden sector information into one or all of the measurement reports.

In order to use the signaled Psi-Coverage sector information, polygons or any other selected cell representation of the 7 available 3GPP formats of [1] need to be configured for all sectors of the Psi-Coverage or Y-Coverage cells. This should be clear from the description of the position calculation of the CID+TA positioning method that is described in the section on prior art. One 3-15 corner polygon is configured in the eSMLC, for each sector of the Psi-Coverage or Y-Coverage cells.

In order to use the signaled Psi-Coverage sector information, for the AoA case, antenna lobe directions and lobe widths need to be configured for all sectors of the Psi-Coverage or Y-Coverage cells. This should be clear from the description of the position calculation of the CID+AoA positioning method that is described in the section on prior art.

The position calculation in the positioning node is performed as described in prior art, with the exception that sector polygons associated with the UE are used, rather than the cell polygon associated with the Psi-Coverage or Y-Coverage base stations.

Figure 14:
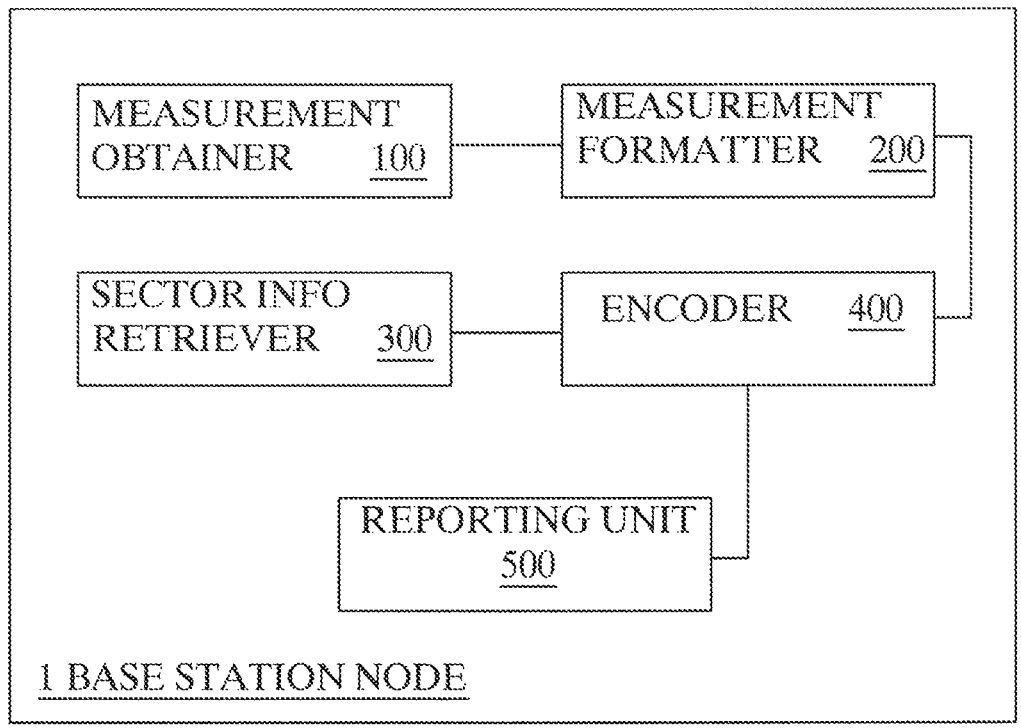
FIG. 14 illustrates an embodiment of a base station node according to the present disclosure.
Figure 16:
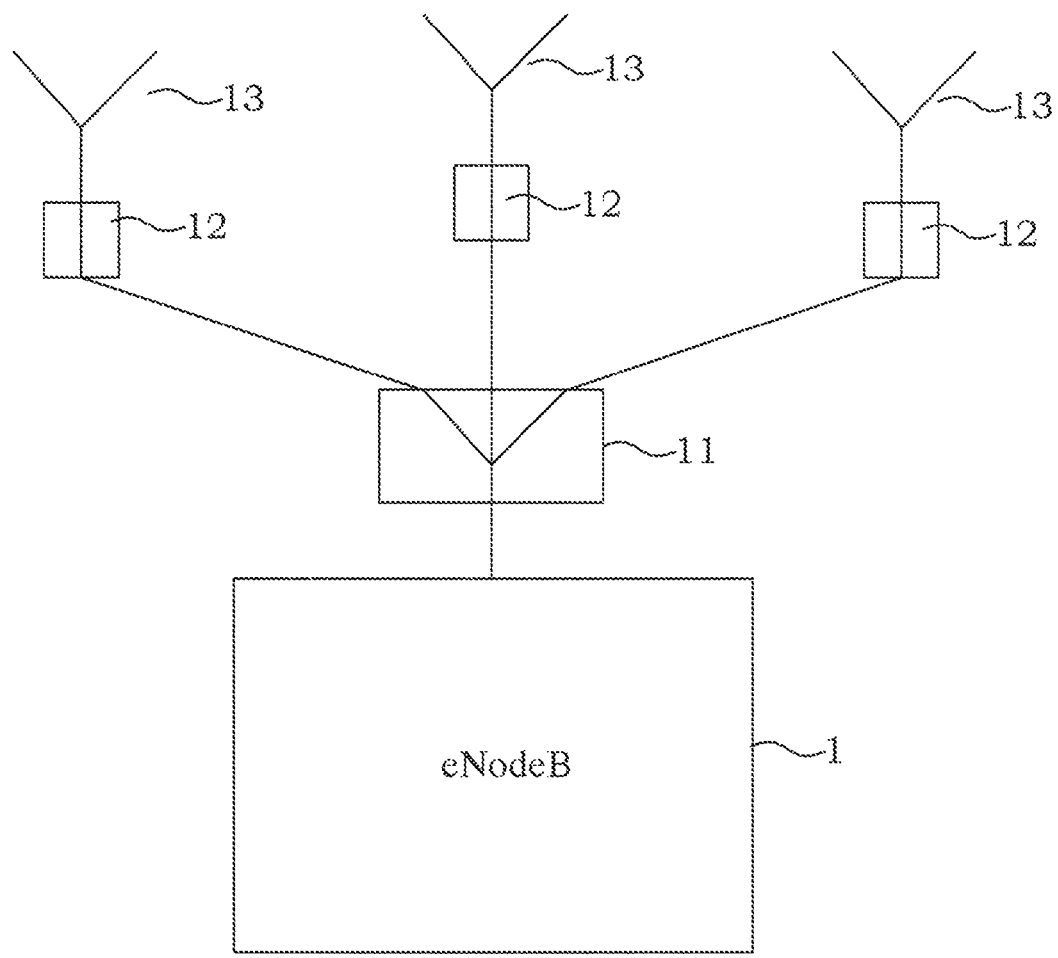
FIG. 16 illustrates a base station node with Psi-coverage configuration.
Figure 17:
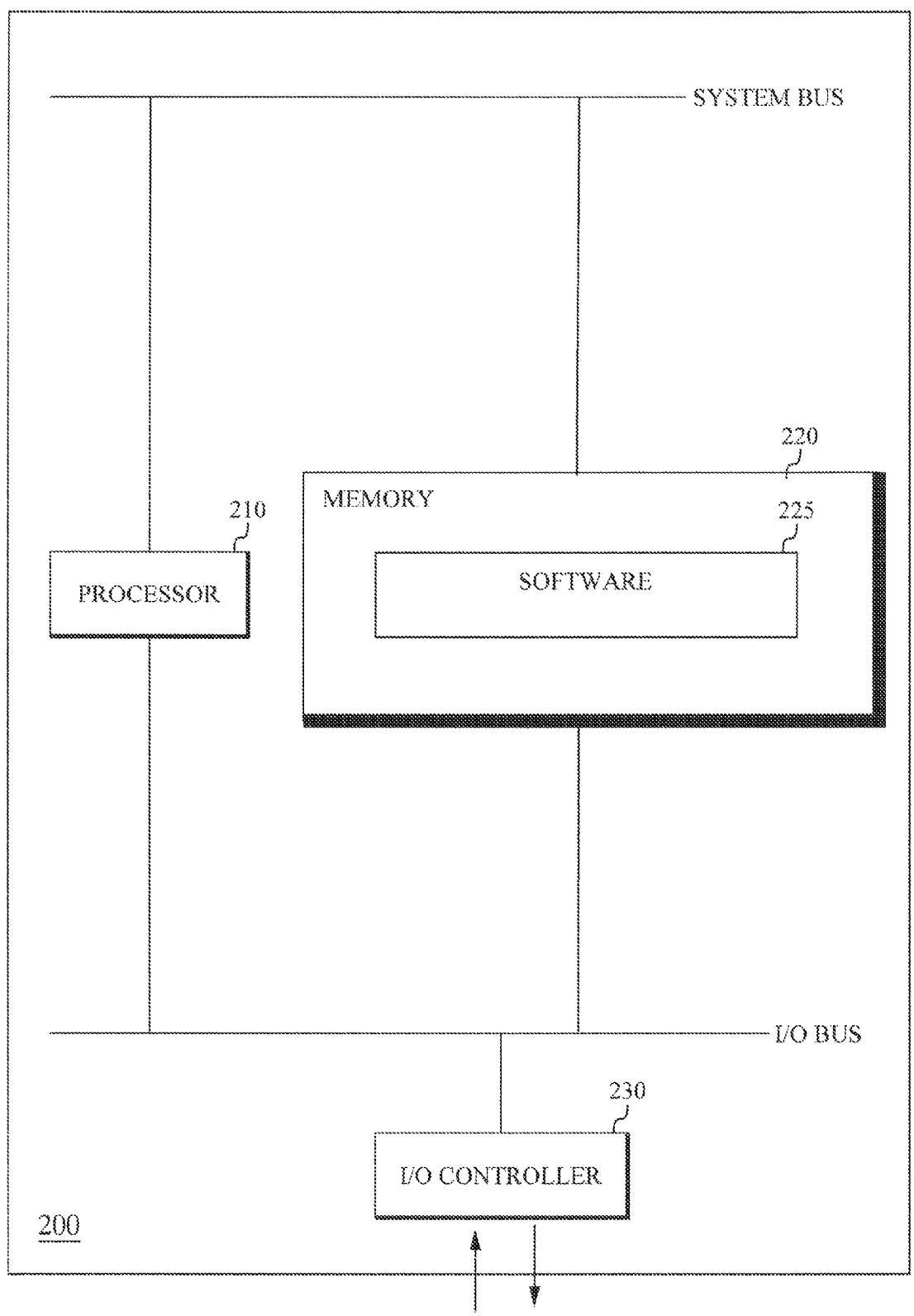
FIG. 17 illustrates a computer implementation of the present disclosure.

With reference to FIG. 14 and FIG. 16, an embodiment of a base station node 1 according to the present disclosure will be described. The base station node 1 is configured as a known Psi-coverage or Y-coverage base station node with a splitter combiner unit 11 connecting the radio unit 1 with the three sector antennas 13 via the TMF 11. In addition, and according to the present disclosure, the base station node 1 includes an enhanced cell-ID measurement obtainer 100 configured to obtain enhanced cell-ID measurements associated with a first user equipment communicating with the base station node 1. The obtained measurements are either generated e.g. measured in the base station node, or generated in some other node e.g. UE in the network and subsequently signaled to and received (and thus obtained) in the base station node. Further, the base station node 1 includes a formatter 200 for formatting the obtained enhanced cell-ID measurements into information elements of a measurement report, each such information element comprising a plurality of symbols or bits. In addition, the base station node 1 includes a sector information retriever for retrieving or accessing hidden sector information relating to the first user equipment, which information is only internally known in the base station node. An encoder 400 in the radio base station node is configured for encoding the retrieved hidden sector information using one or more selected symbols of the measurement report. Thereby the measurement report is transformed or augmented with the hidden sector information. Finally, the radio base station node 1 includes a reporting unit for reporting the transformed measurement report to a positioning node in the system. Thereby, the base station node is able to jointly report enhanced cell-ID measurements and sector information without introducing additional signaling.

Figure 15:
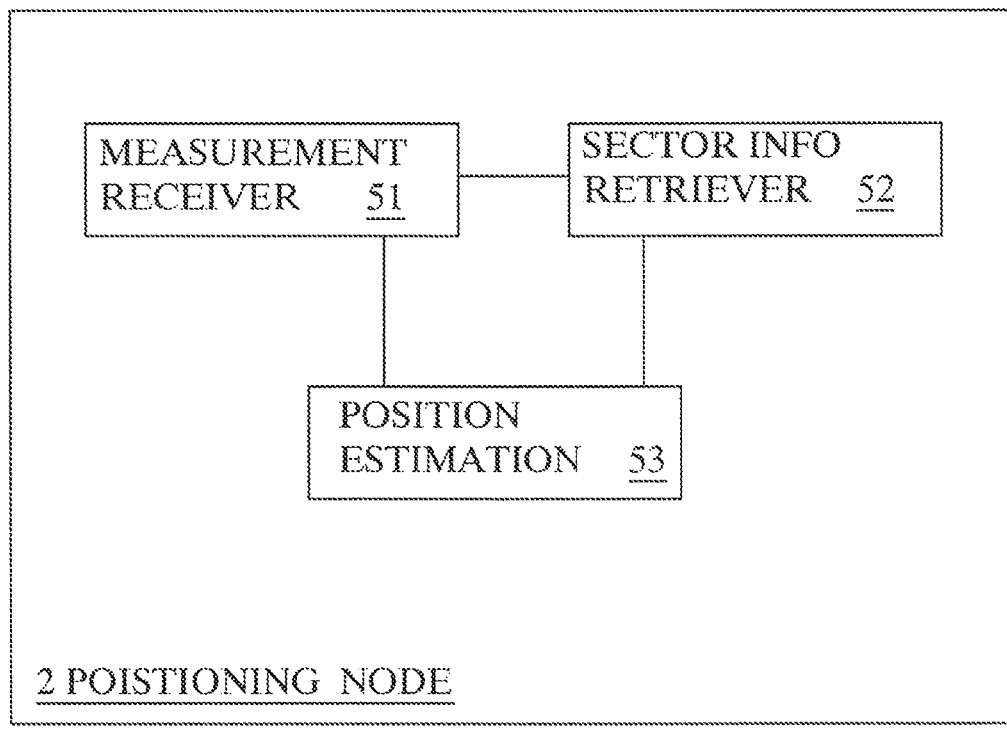
FIG. 15 illustrates an embodiment of a positioning node according to the present disclosure.

With reference to FIG. 15, an embodiment of a positioning node according to the present disclosure will be described. The positioning node 2 e.g. eSMCL node, in a LTE wireless communication system comprises a receiver 51 configured for receiving a measurement report concerning a first user equipment communicating with a base station node in the system, the measurement report comprising enhanced cell-ID measurements associated with the first user equipment, and hidden sector information comprising an indication of an antenna sector of the base station node in which the first user equipment is located. Further, the positioning node 2 includes; a retriever 52 configured for retrieving the enhanced cell-ID measurements and the hidden sector information. Finally, the positioning node 2 includes an estimator 53 configured for estimating a position of the first user equipment in the wireless communication system based on the enhanced cell-ID measurements and the hidden sector information.

In some situations, more sectors than three may be used in the Psi-Coverage eNodeB in future extensions. It may then be needed to use more bits than 2 to encode the sector information in the TA/RSSI/AoA measurement report(s), at the price of an increased measurement inaccuracy. With 3 bits 8 sectors can be reported at the cost of an 40 m inaccuracy increase (TA case), with 4 bits, 16 sectors can be encoded at the cost of a 80 m inaccuracy loss (TA case) and so forth. It is anticipated that the gains associated with a better radial resolution at the cost of a loss of radial accuracy will persist up to accuracy losses corresponding to at least 4 bits, and significantly more in suburban and rural regions for which the Psi-Coverage and Y-Coverage eNodeBs are tailored.

The steps, functions, procedures, and/or blocks described above may be implemented in hardware using any conventional technology, such as discrete circuit or integrated circuit technology, including both general-purpose electronic circuitry and application-specific circuitry.

Alternatively, at least some of the steps, functions, procedures, and/or blocks described above may be implemented in software for execution by a suitable processing device, such as a microprocessor, Digital Signal Processor (DSP) and/or any suitable programmable logic device, such as a Field Programmable Gate Array (FPGA) device.

It should also be understood that it might be possible to re-use the general processing capabilities of the network nodes. For example this may, be performed by reprogramming of the existing software or by adding new software components.

The software may be realized as a computer program product, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

In the following, an example of a computer-implementation will be described with reference to FIG. 13. A computer 300 comprises a processor 310, an operating memory 320, and an input/output unit 330. In this particular example, at least some of the steps, functions, procedures, and/or blocks described above are implemented in software 325, which is loaded into the operating memory 320 for execution by the processor 310. The processor 310 and memory 320 are interconnected to each other via a system bus to enable normal software execution. The I/O unit 330 may be interconnected to the processor 310 and/or the memory 320 via an I/O bus to enable input and/or output of relevant data such as input parameter(s) and/or resulting output parameter(s).

The advantages of the present disclosure include:

At least 3 times better accuracy of the CID+TA positioning function as compared to the situation without the sector information. At least 3 times better accuracy of the CID+single leg RSSI positioning method as compared to a situation without the sector information. AoA+CID and AoA+TA+CID positioning becomes useable, the cell ID information without the sector information otherwise renders this positioning method useless.

In addition, by utilizing the current disclosure no performance loss is caused, and no interoperability problems in multi-vendor situations arise.

Further, an enhanced market potential in rural USA where E-911 emergency positioning accuracy requirements would otherwise be a severe problem for the Psi-Coverage and Y-Coverage base stations, and similar in China where AoA positioning is foreseen to be used.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] Universal Geographical Area Description (GAD), 3GPP TS 23.032, release 6 (v6.0.0), December, 2004. Available: www.3gpp.org
[2] 3GPP TS 32.792 V1.0.0 (2011-03) Generic Radio Access Network (RAN), Network Resource Model (NRM) Integration Reference Point (IRP); Information Service (IS) (Rel.0).
[3] 3GPP TS 32.762 V10.3.0 (2011-03) Evolved Universal Terrestrial Radio Access Network (E-UTRAN) Network Resource Model (NRM) Integration Reference Point (IRP): Information Service (IS) (Rel.10).

The invention claimed is:

1. A method of reporting hidden sector information from a base station node in a wireless communication system, said base station node being an omni base station node with an internal multi-sector structure that is hidden from the rest of the system, and said hidden sector information comprising sector information of said multi-sector structure that is hidden from the rest of the system and only internally available in said omni base station, and said method comprising:
   obtaining, in said base station node, enhanced cell-ID measurements associated with a first user equipment communicating with said base station node;
   formatting in said base station node, said obtained enhanced cell-ID measurements into information elements of a measurement report, each such information element comprising a plurality of symbols;
   retrieving in said base station node, hidden sector information for said first user equipment, said hidden sector information comprising an indication of an antenna sector of said base station in which said first user equipment is located;
   encoding in said base station node, said retrieved hidden sector information using at least one selected symbol of said plurality of symbols of said measurement report to provide a transformed measurement report; and
   reporting from said base station node, said transformed measurement report.

2. The method of claim 1, wherein said enhanced cell-ID measurements comprise at least one of an indication of a received signal strength from said base station in said first user equipment and an indication of an angular orientation of said first user equipment relative a predetermined reference direction.

3. The method of claim 2, wherein said angular orientation comprises an angle of arrival relative said predetermined reference direction.

4. The method of claim 3, wherein said hidden sector information further comprises at least sector identifying information associated with said antenna sector.

5. The method of claim 4, wherein said hidden sector identifying information comprises an ID.

6. The method of claim 4, wherein said hidden sector identifying information comprises an angular orientation relative said reference direction.

7. The method of claim 1, wherein said enhanced cell-ID measurements comprise at least one of an angle of arrival and received signal strength for said first user equipment.

8. The method of claim 1, wherein said at least one selected symbol of said measurement report comprises at least one symbol with a predetermined bit significance.

9. The method of claim 1, wherein said at least one selected symbol is selected to be a least significant symbol.

10. The method of claim 1, wherein said base station is an eNodeB in a Long Term Evolution (LTE) system.

11. The method of claim 1, wherein said reporting is performed using a Long Term Evolution Positioning Protocol annex (LPPa) protocol between said base station node and a positioning node in the system.

12. A base station node in a wireless communication system, said base station node being an omni base station node with an internal multi-sector structure that is hidden from the rest of the system, said base station node comprising:
   an enhanced cell-ID measurement obtainer configured for providing enhanced cell-ID measurements associated with a first user equipment communicating with said base station node;
   a formatter configured for formatting said obtained enhanced cell-ID measurements information elements of a measurement report, each such information element comprising a plurality of symbols;
   a sector information retriever configured for retrieving hidden sector information for said first user equipment, said hidden sector information comprising an indication of an antenna sector of said base station node in which said first user equipment is positioned, said hidden sector information comprising sector information of said multi-sector structure that is hidden from the rest of the system and only internally available in said omni base station;

an encoder configured for encoding said retrieved hidden sector information using at least one selected symbol of said plurality of symbols of said measurement report to provide a transformed measurement report; and a reporting unit configured for reporting said transformed measurement report.

13. The base station node of claim 12, wherein said enhanced cell-ID measurement obtainer is configured for obtaining at least one of an indication of a received signal strength from said base station in said first user equipment and an indication of an angular orientation of said user equipment relative a predetermined reference direction.

14. The base station node of claim 13, wherein said hidden sector information comprises an angle of arrival relative said predetermined reference direction.

15. The base station node of claim 14, wherein said hidden sector information further comprises at least sector identifying information associated with said antenna sector.

16. The base station node of claim 15, wherein said hidden sector identifying information comprises an ID.

17. The base station node of claim 15, wherein said hidden sector identifying information comprises an angular orientation relative said reference direction.

18. The base station node of claim 13, wherein said enhanced cell-ID measurements comprise at least one of an angle of arrival and received signal strength for said first user equipment.

19. The base station node of claim 13, wherein said encoder is configured for selecting said at least one selected symbol of said measurement report to comprise at least one symbol with a predetermined bit significance.

20. The base station node of claim 13, wherein said encoder is configured for selecting said at least one selected symbol to be a least significant symbol.

21. The base station node of claim 13, wherein said base station node is an eNodeB in a Long Term Evolution (LTE) system.

22. The base station node according to claim 12, wherein said reporting is performed using a Long Term Evolution Positioning Protocol annex (LPPa) protocol between said base station node and a positioning node in the system.

23. A method of positioning of a first user equipment in a wireless communication system, said method comprising:
receiving, at a positioning node, at least one transformed measurement report from a base station node, said transformed measurement report comprising formatted enhanced cell-ID measurements associated with said first user equipment and hidden sector information comprising an indication of an antenna sector of said base station node in which said first user equipment is located, said base station node being an omni base station node with an internal multi-sector structure that is hidden from the rest of the system, and said hidden sector information comprising sector information of said multi-sector structure that is hidden from the rest of the system and only internally available in said omni base station;

retrieving, at the positioning node, said enhanced cell-ID measurements and hidden sector information from said measurement report; and estimating, at the positioning node, a position of said first equipment based on said enhanced cell-ID measurements and said hidden sector information.

24. A positioning node in a Long Term Evolution (LTE) wireless communication system, said node comprising:
a receiver configured for receiving a measurement report concerning a first user equipment communicating with a base station node in said system, said measurement report comprising enhanced cell-ID measurements associated with said first user equipment, and hidden sector information comprising an indication of an antenna sector of said base station node in which said first user equipment is located, said base station node being an omni base station node with an internal multi-sector structure that is hidden from the rest of the system, and said hidden sector information comprising sector information of said multi-sector structure that is hidden from the rest of the system and only internally available in said omni base station;

a retriever configured for retrieving said enhanced cell-ID measurements and said hidden sector information; and an estimator configured for estimating a position of said first user equipment based on said enhanced cell-ID measurements and said hidden sector information.

* * * * *